(12) United States Patent
Gallagher

(10) Patent No.: US 10,104,572 B2
(45) Date of Patent: *Oct. 16, 2018

(54) METHOD AND SYSTEM FOR OPTIMIZING BANDWIDTH UTILIZATION IN AN IN-HOME NETWORK

(71) Applicant: Maxlinear, Inc., Carlsbad, CA (US)

(72) Inventor: Timothy Gallagher, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/943,141

(22) Filed: Apr. 2, 2018

(65) Prior Publication Data

US 2018/0227791 A1 Aug. 9, 2018

Related U.S. Application Data

(63) Continuation of application No. 15/783,116, filed on Oct. 13, 2017, now Pat. No. 9,936,417, which is a continuation of application No. 14/305,417, filed on Jun. 16, 2014, now Pat. No. 9,794,823, which is a continuation of application No. 13/301,488, filed on Nov. 21, 2011, now Pat. No. 8,767,554.

(51) Int. Cl.
*H04W 28/02* (2009.01)
*H04W 40/12* (2009.01)
(Continued)

(52) U.S. Cl.
CPC ....... *H04W 28/0252* (2013.01); *H04L 47/122* (2013.01); *H04L 47/125* (2013.01);
(Continued)

(58) Field of Classification Search
CPC ............... H04L 5/0046; H04L 12/2801; H04L 12/2838; H04N 21/43615;
(Continued)

(56) References Cited

U.S. PATENT DOCUMENTS

| 7,715,312 B2 | 5/2010 | Khasnabish et al. |
| 2003/0063613 A1 | 4/2003 | Carpini et al. |

(Continued)

*Primary Examiner* — Ian N Moore
*Assistant Examiner* — Brian T Le
(74) *Attorney, Agent, or Firm* — McAndrews, Held & Malloy

(57) ABSTRACT

Methods and systems for optimizing bandwidth utilization in an in-home network may comprise determining usage and/or quality of communication links operating in accordance with first and second communication protocols in a multi-protocol wired and wireless network. Data communication may be routed from a first communication link operating in accordance with the first communication protocol to a second communication link operating in accordance with the second communication protocol, based on the determining. The first communication protocol may comprise a multimedia over cable alliance (MoCA) standard and the second communication protocol may comprise an IEEE 802.11x standard. The determining and routing may be performed by a MoCA network controller. The first communication protocol may comprise an IEEE 802.11x standard and the second communication protocol may comprise a MoCA standard. The rerouting may increase bandwidth usage efficiency and/or data throughput of the network. The determining and rerouting may be performed dynamically.

32 Claims, 5 Drawing Sheets

(51) Int. Cl.
   *H04L 12/803*    (2013.01)
   *H04W 36/22*    (2009.01)
   H04L 29/06    (2006.01)
   H04W 84/10    (2009.01)
   H04L 12/707    (2013.01)
   H04W 36/14    (2009.01)

(52) U.S. Cl.
   CPC ............ *H04W 36/22* (2013.01); *H04W 40/12* (2013.01); *H04L 29/06088* (2013.01); *H04L 45/22* (2013.01); *H04W 36/14* (2013.01); *H04W 84/10* (2013.01)

(58) Field of Classification Search
   CPC ......... H04N 21/43632; H04N 21/6118; H04N 21/43637; H04W 84/12; H04W 88/06
   See application file for complete search history.

(56) References Cited

U.S. PATENT DOCUMENTS

| | | |
|---|---|---|
| 2006/0251094 A1 | 11/2006 | Van Vleck et al. |
| 2007/0183402 A1 | 8/2007 | Bennett et al. |
| 2008/0313691 A1 | 12/2008 | Cholas et al. |
| 2009/0310615 A1 | 12/2009 | Bernard et al. |
| 2010/0284275 A1 | 11/2010 | Martinez et al. |
| 2011/0103255 A1 | 5/2011 | Ikeda et al. |
| 2011/0105028 A1 | 5/2011 | Yu et al. |
| 2011/0122854 A1 | 5/2011 | De Lind Van Wijngaarden |
| 2012/0033682 A1 | 2/2012 | Corral |
| 2012/0195204 A1 | 8/2012 | Patel et al. |
| 2013/0003875 A1 | 1/2013 | Abad Molina et al. |

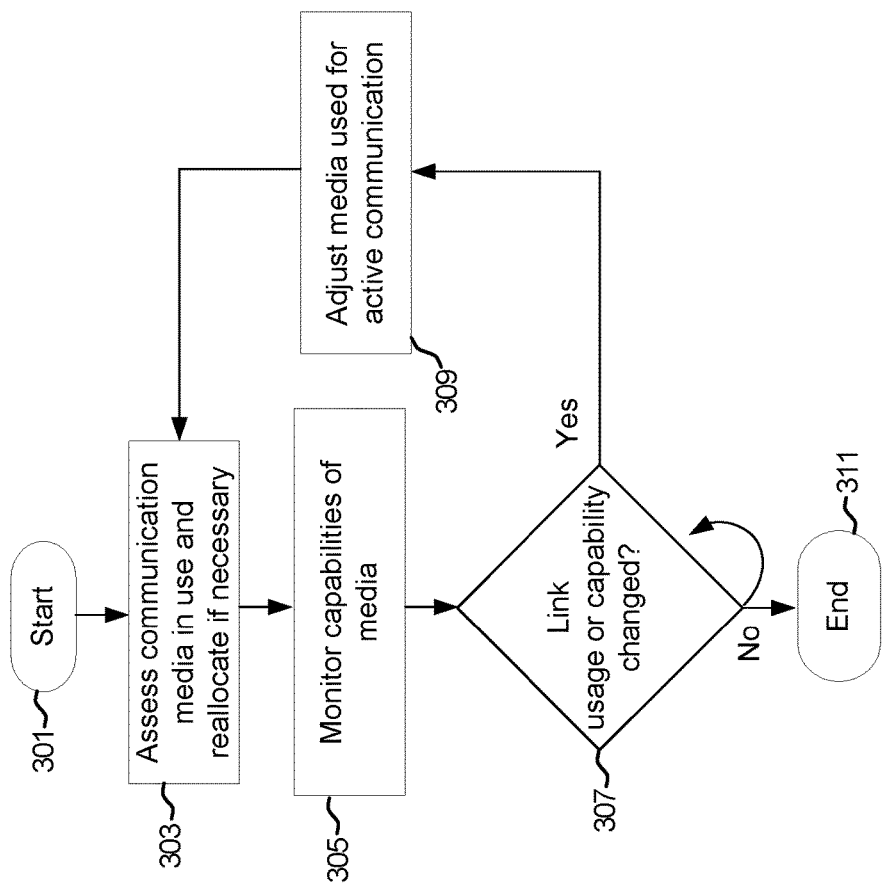

METHOD AND SYSTEM FOR OPTIMIZING BANDWIDTH UTILIZATION IN AN IN-HOME NETWORK

CROSS-REFERENCE TO RELATED APPLICATIONS

This application is a continuation of application Ser. No. 15/783,116 filed on Oct. 13, 2017, which is a continuation of application Ser. No. 14/305,417 filed on Jun. 16, 2014, now U.S. Pat. No. 9,794,823, which is a continuation of application Ser. No. 13/301,488 filed on Nov. 21, 2011, now U.S. Pat. No. 8,767,554. Each of the above-cited applications is herein incorporated by reference in its entirety.

FIELD OF THE INVENTION

Certain embodiments of the invention relate to multimedia communication. More specifically, certain embodiments of the invention relate to a method and system for optimizing bandwidth utilization in an in-home network.

BACKGROUND OF THE INVENTION

Although computer networks have been in existence for decades, they only recently became commonplace in homes. Wired networks over various types of wire and cable as well as wireless networks over consumer wireless routers have been developed for use in residential applications.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for optimizing bandwidth utilization in an in-home network, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 is a block diagram illustrating exemplary steps in optimizing bandwidth utilization in an in-home network, in accordance with an embodiment of the invention.

DETAILED DESCRIPTION OF THE INVENTION

Certain aspects of the invention may be found in a method and system for optimizing bandwidth utilization in an in-home wired and wireless network. Exemplary aspects of the invention may comprise determining usage and/or quality of communication links in a first communication protocol and a second communication protocol in a multi-protocol wired and wireless network. Data communication may be routed from the first communication protocol to the second communication protocol based on the determining. The communication protocol may comprise a Multimedia over Cable Alliance (MoCA) standard and the second communication protocol may comprise an IEEE 802.11x standard. The determining and rerouting may be performed by one or more MoCA network controllers. The first communication protocol may comprise an IEEE 802.11x standard and the second communication protocol may comprise a Multimedia over Cable Alliance (MoCA) standard. The rerouting may increase bandwidth usage efficiency and/or data throughput of the multi-protocol wired and wireless network. The determining and rerouting may be performed dynamically.

Figure 1:
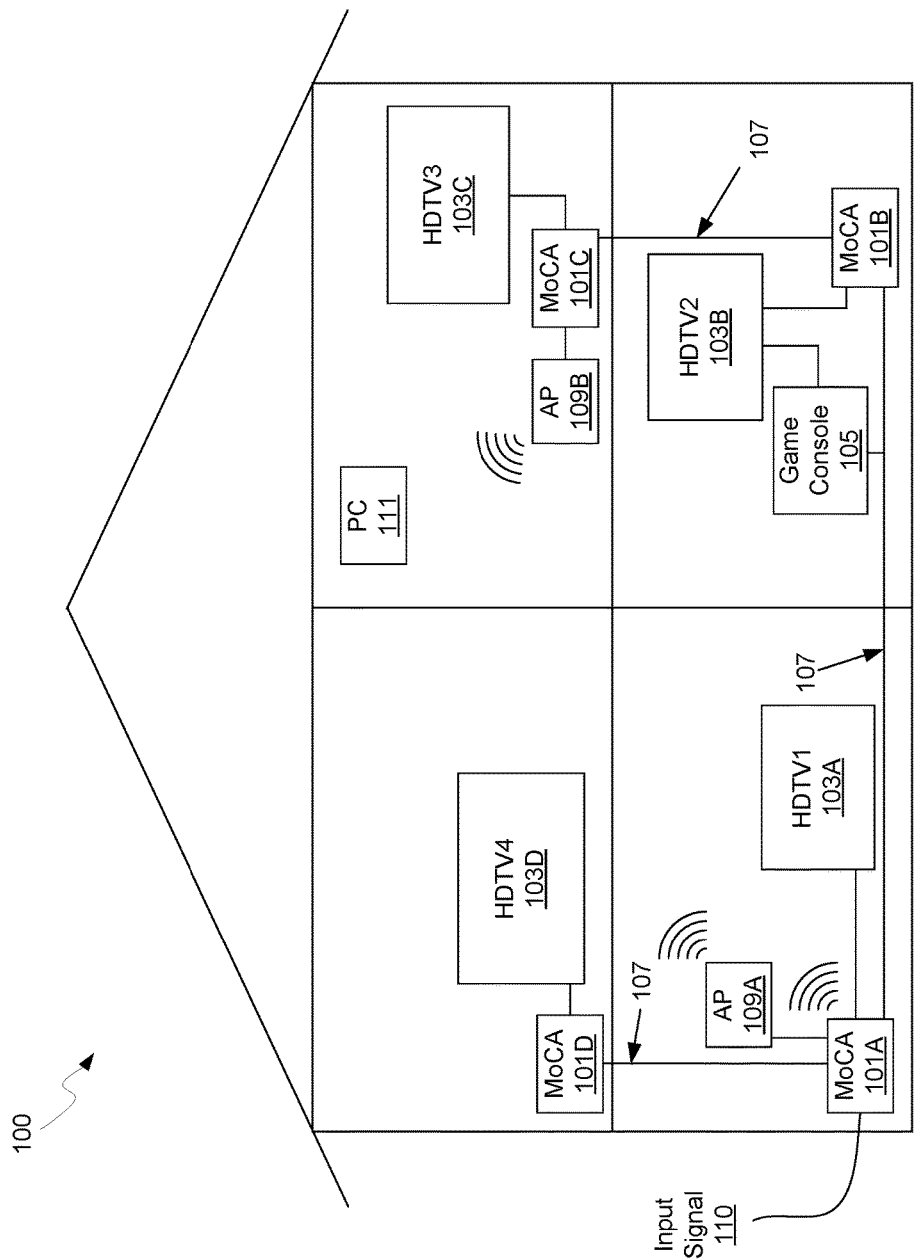
FIG. 1 is a diagram illustrating exemplary dwelling-based networks, in accordance with an embodiment of the invention.

FIG. 1 is a diagram illustrating exemplary dwelling-based networks, in accordance with an embodiment of the invention. Referring to FIG. 1, there is shown a dwelling-based wired and wireless network 100 spanning a plurality of rooms in the dwelling, where each one may have one or more networked devices. There is also shown Multimedia over Cable Alliance (MoCA) bridges 101A-101D, high-definition televisions (HDTVs) 103A-103D, a game console 105, wireless access points 109A and 109B, a personal computer 111, coaxial cables 107, and an input signal 110, which may be provided by a cable head-end or a satellite signal source, for example.

The MoCA bridges 101A-101D (or general MoCA devices) may comprise network bridges that enable a secure wired network utilizing the coaxial cables 107 in the dwelling wired and wireless network 100. The MoCA bridges 101A-101D may operate under the MoCA 1.x or 2.x specification, for example, and may communicate signals between bridges in a 1-2 GHz frequency range. Other communication protocols may be utilized on the same coaxial cables 107. One or more of the MoCA bridges 101A-101D may comprise a network controller in the wired network, coordinating the wired network communications as per the MoCA standard. For example, a first of the MoCA bridges 101A-101D may operate as the MoCA network controller, while a second operates as a back-up network controller.

In another exemplary embodiment, one or more of the MoCA bridges 101A-101D may be operable to provide a WLAN network without the need for an access point, such as the access points 109A and 109B.

Cable television signals, including DOCSIS signals, may be communicated in the 50 MHz to 1 GHz range, for example. The cable range generally has about 150 6-MHz TV channels, some of which are allocated to DOCSIS, some to digital television, and some to analog television. DOCSIS may, for example, be used to provide Internet access to the cable subscriber.

The access point 109 may be operable to provide wireless network access to devices within the dwelling-based wired and wireless network 100. Exemplary wireless networks may comprise wireless local area networks (WLANs) that conform to the IEEE 802.11 (e.g., a, g, n, and ac) protocol, femtocells, Bluetooth, ZigBee networks, or any other non-public networks. The access point 109 may be coupled to the MoCA bridge 101A via a wired connection, such as a coaxial cable or an Ethernet cable, for example.

The coaxial cables 107 may provide variable quality communications channels depending on wire quality, splitters, junctions, or damage to the cables, for example. These variations may be relatively constant and be measured by signal strength or signal to noise ratio, for example. However, the quality of communications over a wireless network, such as that provided by the access point 109 may vary significantly more over shorter periods than wired networks due to RF interference, the amount of traffic, or distance to the receiving device, and may be measured by signal strength, signal to noise ratio, and bit error rate, for example.

In an exemplary embodiment of the invention, one or more of the MoCA bridges 101A-101D may dynamically monitor the quality of communications channels over the available networks and direct traffic based on the optimum network. For example, if a coaxial cable path has been adversely affected by a poor quality splitter or has excessive traffic at a given time, one or more of the MoCA bridges 101A-101D acting as a network controller may direct traffic over the wireless network provided by the access point 109, or may direct part of the communications over the wireless network. In this example, the packets may be received and correlated by the receiving device to reconstruct the original data stream.

In another exemplary scenario, if each of the HDTVs 103A-103D is streaming HD video concurrently, the traffic over certain lengths of the coaxial cables 107 may be excessively high, while the MoCA bridge 101A may sense that the access point 109 is operating with a low traffic flow and with low interference levels, such that it is advantageous to redirect some of the communication data stream to the HDTV3 103C via the wireless network instead of through the coaxial cables 107, or partially through each link.

In an exemplary scenario, the identification of current bandwidth utilization may be a dynamic process such that the configuration of optimum communications channels may be dynamically configured. For example, as different wired or wireless links degrade, the MoCA bridge 101A-101D that is acting as the network controller may direct the devices communicating over the degraded channel or channels to utilize another path or communications protocol. Such adjustment may, for example, be performed periodically (e.g., by scheduled periodic test) or may be performed upon detection of an event (e.g., detection of a change in spectral content in the cable/DOCSIS spectrum and/or WLAN spectrum, detection of a user command that will result in a change in cable/DOCSIS and/or WLAN utilization, detection of interference signals or a drop in signal intensity via the coaxial cables 107 and/or WLAN RF environment etc.).

In another exemplary scenario, the MoCA bridge of the MoCA bridges 101A-101D that is acting as a network controller may direct network traffic to a particular device via a combination of the available network media, i.e. over both wired and wireless paths. For example, in an exemplary implementation, packets of a single data stream may be numbered for the single data stream for ultimate combination at the receiving end of the communication. Such packets may also be numbered for their respective media (e.g., packets communicated via a wireless medium may be numbered in accordance with the wireless communication protocol, and packets communicated via a wired medium may be numbered in accordance with the wired communication protocol). In such an implementation, an overall data stream of packets may be split into multiple sub-streams for multiple respective communication protocols, respective apparatus associated with such multiple communication protocols may then independently communicate their respective sub-streams of data packets, and the receiving entity of such sub-streams of data packets may then re-combine the sub-streams into a single received data stream of packets.

In another multi-pathway example, in a multimedia communication (e.g., an audio/video communication), a first media (e.g., a video component) may be communicated via a cable medium, and a second media (e.g., an audio component) may be communicated via a wireless medium. In a further multipath example, in a communication involving the communication of general data information and control information, the general data information may be communicated via a cable medium, and the control information may be communicated via a wireless medium. Note that in such multi-pathway communication may also include the communication of redundant information via each pathway (e.g., critical information may be communicated over both the wired medium and over the wireless medium).

In yet another exemplary multi-pathway scenario, the first and second media may both comprise wired media. For example, the first pathway may comprise coaxial cables for a cable network (e.g., MoCA), and the second pathway may comprise Ethernet lines. Similarly, in a singly pathway, multi-protocol communication, coaxial lines may be utilized to communicate MoCA signals and Home Phone Alliance (HPNA) signals.

Furthermore, the network controller may determine the bit-loading between every node, such bit-loading being indicative of modulation constellation selection, which in turn is generally indicative of communication channel quality. For example, if a node is using BPSK, the network controller may command an offload to a different medium (e.g., an offload to WLAN, WiFi, wireline, etc.). However, if there is plenty of available bandwidth, the network controller may allow BPSK in a poor quality link. In other words, the current bandwidth utilization may be a factor in determining and configuring bit-loading between various nodes in the network.

In yet another exemplary scenario, where a particular link in a MoCA network is quite poor, entities communicating over such a poor link are essentially robbing bandwidth from the other MoCA clients. In such a scenario, either the devices can autonomously decide to communicate over a wireless link or links, or the network controller may monitor the situation and direct the MoCA clients to use alternative means of communication. Accordingly, the network controller(s) and/or other devices may perform capability-discovery to determine whether alternative communication pathways are available.

While FIG. 1 shows MoCA and cable/DOCSIS communications protocols, any network protocol may be applicable, where the network bridge has the capability to communicate via and/or knowledge of two or more communications protocols. The integration of two or more protocols in the network device and knowledge of channel usage and quality assists with efficient use of the available network media.

Figure 2A:
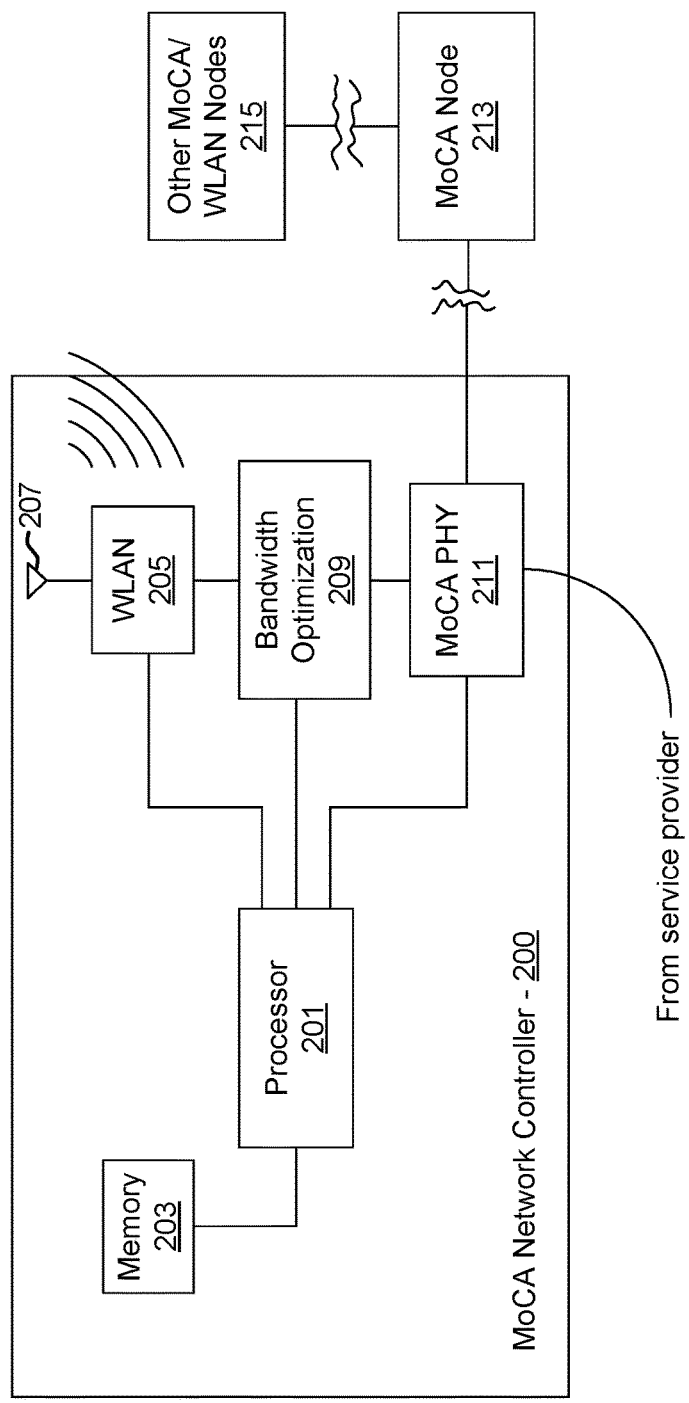
FIG. 2A is a diagram illustrating an exemplary network controller, in accordance with an embodiment of the invention.

FIG. 2A is a diagram illustrating an exemplary network controller, in accordance with an embodiment of the invention. Referring to FIG. 2A, there is shown a network controller 200 comprising a processor 201, a memory 203, a WLAN module 205, a WLAN antenna 207, a bandwidth optimization module 209, a MoCA PHY 211, a MoCA node 213, and other MoCA/WLAN nodes 215.

The processor 201 may be operable to control the operation of the MoCA network controller. For example, the processor 201 may configure the WLAN 205 to communicate signals at a desired frequency or may configure MoCA channels to be utilized by the MoCA PHY 211. In another embodiment of the invention, the processor 201 may be utilized to update and/or modify programmable parameters and/or values in a plurality of components, devices, and/or processing elements in the bandwidth optimization module 209. At least a portion of the programmable parameters may be stored in the memory 203. Furthermore, the memory 203 may be operable to store communications link configurations and corresponding bandwidth utilizations for future retrieval and determining of future optimum configurations.

The WLAN module 205 may be operable to communicate wireless RF signals via the antenna 207 thereby providing wireless network capability to the MoCA network controller 200. WLAN module 205 may be operable to down-convert received RF signals to baseband for processing by the processor 201, and may up-convert baseband signals received from the processor 201 for communication to devices utilizing the WLAN provided by the WLAN module 205.

The bandwidth optimization module 209 may be operable to discover the capability of various network protocol capabilities at a given time for the optimum use of the available bandwidth (e.g. bandwidth available in a home network). For example, the bandwidth optimization module 209 may be operable to measure the data throughput in the MoCA PHY 211 and the WLAN module 207, and redirect data traffic through the WLAN 205 in instances where the MoCA PHY 211 has excessive usage or degraded communications channels, such as from low signal strength or signal to noise ratio due to poor quality splitters or cable junctions, for example. Similarly, when the wireless network provided by the WLAN module 205 may be degraded due to interference or barriers to the RF signals, or has an excessive data throughput, some of the data may be rerouted through the MoCA PHY 211 to ease the data throughput on the wireless network.

The MoCA PHY 211 may be operable to communicate signals over coaxial cables, such as the coaxial cables 107, where the signals conform to the MoCA 1.x and/or 2.x standards, to one or more remote MoCA nodes, such as the MoCA node 213. Accordingly, transmissions may be PHY frames scheduled in accordance with the Media Access Control (MAC) Layer specifications, and as such may comprise a PHY preamble and a PHY payload and may apply OFDM modulation. The MoCA network controller 200 may schedule and broadcast specific start and stop times at which transmissions from each node begin and end.

The MoCA node 213 may comprise a generic MoCA device, such as a cable set top box, for example, that may be controlled by the MoCA network controller 200 to optimize bandwidth usage. In another exemplary scenario, the MoCA node 213 may be substantially similar to the MoCA network controller 200 with similar capabilities of optimizing bandwidth of wired and wireless communications in the dwelling wired and wireless network 100. In this embodiment, the MoCA network controller 200 and the MoCA node 213 may work in conjunction to optimize bandwidth usage, with each device independently assessing communications links quality and capabilities and coordinating usage based on these assessments. The other MoCA nodes 215 may comprise one or more other nodes or devices that utilize the wired and wireless networks in the dwelling wired and wireless network 100, and may comprise slave nodes that may be controlled by the MoCA network controller 200 and the MoCA node 213, or may also be capable of acting as a network controller. The controlling nodes may be operable to configure the communications channels used by all devices in the wired and wireless networks.

In operation, the MoCA network controller 200, and/or another device that is acting as a network controller, may direct network traffic to and from a particular device via a combination of the available network media, i.e. over both wired and wireless paths via the MoCA PHY 211 and the WLAN module 205. The MoCA network controller 200 may configure the communications links between all other network nodes within the dwelling wired and wireless network 100.

The MoCA network controller 200 may determine the bit-loading between every node and/or the communication link quality of the various media. For example, if a node is using BPSK, the MoCA network controller 200 may command an offload to a different medium (e.g., an offload to WiFi, wireline, etc.). However, if there is plenty of available bandwidth, the MoCA network controller 200 may allow BPSK in a poor quality link. In other words, the current bandwidth utilization may be a factor in determining and configuring bit-loading between various nodes in the network.

In yet another exemplary scenario, where a particular link in a MoCA network is quite poor, such as between the MoCA node 213 and the other MoCA/WLAN nodes 215, entities communicating over such a poor link are essentially robbing bandwidth from the other MoCA clients. In such a scenario, either the devices can autonomously decide to communicate over wireless, or the MoCA network controller 200 may monitor the situation and direct the MoCA clients to use alternative means of communication. Accordingly, the MoCA network controller 200 and/or other devices may perform capability-discovery to determine whether alternative communication pathways are available.

While FIG. 2A shows MoCA and WLAN communications protocols, any network protocol may be applicable, where the MoCA network controller 200 has the capability to communicate via and/or knowledge of two or more communications protocols. The integration of two or more protocols in the network device and knowledge of channel usage and quality assists with efficient use of the available network media.

Additionally, in a scenario involving premises-based (e.g., home-based) communication networks, the total bandwidth utilized is generally within the control of premises-based devices. For example, communication via a MoCA network is controlled by home-based devices, and communication via a WLAN network is also controlled by home-based devices. Such an operational situation (unlike utilization of public networks) advantageously allows for enhanced optimization of communication bandwidth utilization (e.g., because adverse impacts of unpredictable public utilization of communication bandwidth are generally absent).

Figure 2B:
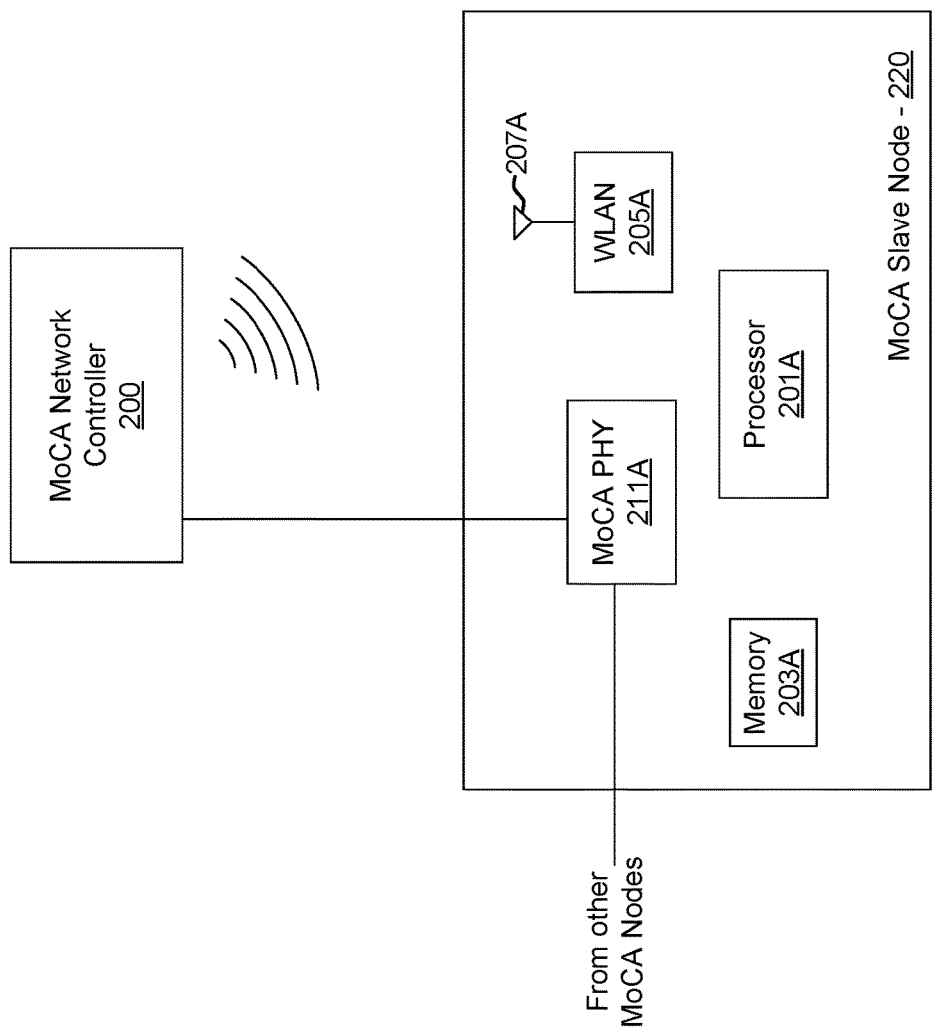
FIG. 2B is a diagram illustrating an exemplary network slave device, in accordance with an embodiment of the invention.

FIG. 2B is a diagram illustrating an exemplary network slave device, in accordance with an embodiment of the invention. Referring to FIG. 2B, there is shown the MoCA network controller 200 and a slave node 220 comprising a processor 201A, a memory 203A, a WLAN module 205A and a MoCA PHY 211A. The processor 201A, the memory 203A, the WLAN module 205A and the MoCA PHY 211A may be substantially similar to the processor 201, the memory 203, the WLAN module 205 and the MoCA PHY 211 described with respect to FIG. 2A, but located within the MoCA slave node 220.

The MoCA slave node 220 may comprise a networked device such as a MoCA bridge, a set-top box, a personal computer, or a gaming device, and may be controlled by the MoCA network controller 200. For example, the MoCA network controller 200 may determine that the wired communications link between the MoCA network controller 200 and the MoCA slave node 220 may be degraded or be carrying too high a data load for optimum bandwidth usage. Accordingly, the MoCA network controller 200 may instruct the MoCA slave node 220 to communicate partially or entirely through the wireless connection between the MoCA network controller 200 and the WLAN module 205A until link conditions change.

The MoCA slave node 220 may assist in the bandwidth optimization by communicating data throughput information to the MoCA network controller 200 for determining the optimum communications links to be utilized. For example, the MoCA slave node 220 may communicate its current bit rate being communicated with other nodes via the wired and wireless links to the bandwidth optimization module 209 in the MoCA network controller 200, as described with respect to FIG. 2A. This information may then be utilized to reallocate data to communications links with lower usage and/or higher quality to more efficiently utilize the available bandwidth. This process may be dynamic, in that the assessment and determining of the current usage, optimum possible usage, and communication link reconfiguration may be performed continuously or on a periodic basis, for example.

In another exemplary embodiment, the MoCA slave node 220 may simply be passive in the bandwidth optimization process, in that the MoCA network controller 200 may simply start communicating via the desired channel instead of instructing the MoCA slave node 220 to communicate via a particular link or combination of links.

While FIG. 2B shows MoCA and WLAN communications protocols, any network protocol may be applicable, where the MoCA network controller 200 and the MoCA slave node 220 have the capability to communicate via and/or knowledge of two or more communications protocols. The integration of two or more protocols in the network device and knowledge of channel usage and quality assists with efficient use of the available network media.

Additionally, in a scenario involving premises-based (e.g., home-based) communication networks, the total bandwidth utilized is generally within the control of premises-based devices. For example, communication via a MoCA network is controlled by home-based devices, and communication via a WLAN network is also controlled by home-based devices. Such an operational situation (unlike utilization of public networks) advantageously allows for enhanced optimization of communication bandwidth utilization (e.g., because adverse impacts of unpredictable public utilization of communication bandwidth are generally absent).

FIG. 3 is a block diagram illustrating exemplary steps in optimizing bandwidth utilization in an in-home network, in accordance with an embodiment of the invention. The exemplary method illustrated in FIG. 3 may, for example, share any or all functional aspects discussed previously with regard to FIGS. 1 and 2. Referring to FIG. 3, after start step 301, in step 303, the MoCA network controller 200 may assess the quality and/or bit loading (e.g., modulation constellation selection) of communications links in use. The MoCA network controller 200 may reconfigure the channel usage of the various networked devices to optimize the bandwidth usage. For example, if a MoCA link is overloaded or has degraded, the MoCA network controller 200 may communicate data over the WLAN module 205 if its wireless capability is suitable.

In step 305, the MoCA network controller 200 may monitor the communication link quality and/or usage. Step 305 may, for example and without limitation, share any or all functional aspects discussed previously (e.g., with regard to FIGS. 1 and 2).

In step 307, if the communication link usage or capability have changed and thereby reduced the bandwidth usage efficiency, the exemplary steps proceed to step 309, where the communication links utilized may be adjusted to more efficiently use available resources. If no change is detected, the process ends in end step 311 (or, for example, loops back to itself for continued monitoring).

Figure 4:
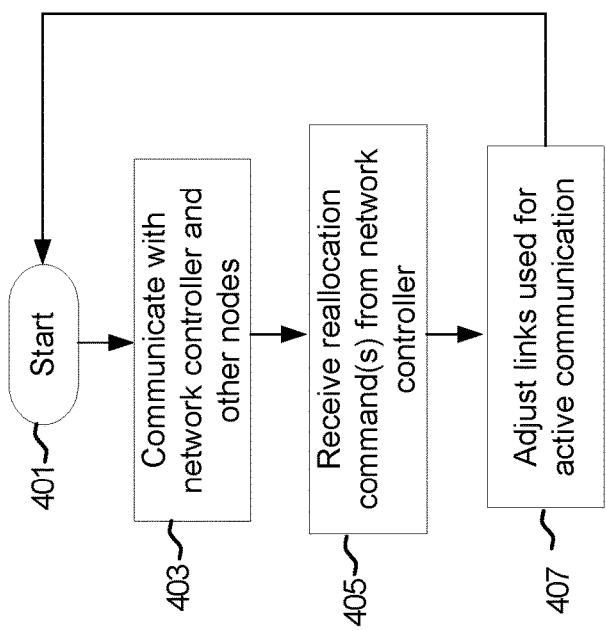
FIG. 4 is a block diagram illustrating exemplary steps in optimizing bandwidth utilization in an in-home network, in accordance with an embodiment of the invention.

FIG. 4 is a block diagram illustrating exemplary steps in optimizing bandwidth utilization in an in-home network, in accordance with an embodiment of the invention. The exemplary method illustrated in FIG. 4 may, for example, share any or all functional aspects discussed previously with regard to FIGS. 1-2B. Referring to FIG. 4, after start step 401, in step 403, the slave network node 220 may communicate with the MoCA network controller 200 and other MoCA or WLAN nodes. The slave network node 220 may communicate current data rates to the MoCA network controller 200 to enable it to determine the optimum bandwidth usage.

In step 405, the MoCA slave network node 220 may receive one or more commands from the MoCA network controller 200. Step 405 may, for example and without limitation, share any or all functional aspects discussed previously (e.g., with regard to FIGS. 1-2B). The commands received may comprise instructions to shift from utilizing MoCA communications over a coaxial cable to wireless communications via the WLAN modules 205 and 205A, for example, because of excessive traffic over the MoCA link or links. For example, multiple devices may be streaming high-definition video to multiple televisions and/or computers such that the MoCA bandwidth is nearly fully utilized while the WLAN links are underutilized. Similarly, the commands may comprise instructions to communicate entirely via a MoCA communication link since the wireless link or links may be suffering from excessive interference at a particular time.

In step 407, the communication links utilized by the MoCA slave network node 220 may be adjusted to more efficiently use available resources. If the communication is not halted by the MoCA network controller 200 or a powering down of the MoCA slave network node 220, the process loops back to step 403 for continued communications.

In an embodiment of the invention, a method and system may comprise determining usage and/or quality of communication links operating in accordance with first and second communication protocols in a multi-protocol wired and wireless network. Data communication may be routed from a first communication link operating in accordance with the first communication protocol to a second communication link operating in accordance with the second communication protocol, based on the determining. The communication protocol may comprise a Multimedia over Cable Alliance (MoCA) standard and the second communication protocol may comprise an IEEE 802.11x standard. The determining and rerouting may be performed by one or more MoCA network controllers. The first communication protocol may comprise an IEEE 802.11x standard and the second communication protocol may comprise a Multimedia over Cable Alliance (MoCA) standard. The rerouting may increase bandwidth usage efficiency and/or data throughput of the multi-protocol wired and wireless network. The determining and rerouting may be performed dynamically.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for optimizing bandwidth utilization in an in-home network.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels of integration on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for multimedia communication, the method comprising:
in a network controller in a premises-based wired and wireless network:
monitoring one or more capabilities of a wired communication link operating in accordance with a wired communication standard and capabilities of a wireless communication link operating in accordance with a wireless local area network standard, in said premises-based wired and wireless network;
communicating reallocation commands to one or more devices in said premises-based wired and wireless network based on said one or more capabilities;
routing a first portion of data communications via said wireless communication link and a second portion of said data communications via said wired communication link; and
configuring a bit-loading of said data communications in said wired communication link and a bit-loading of said data communications in said wireless communication link based on said reallocation commands.

2. The method according to claim 1, wherein said one or more capabilities comprise one or more of: bandwidth, data throughput, usage, and signal-to-noise ratio.

3. The method according to claim 1, wherein said wired communication standard comprises Multimedia over Cable Alliance (MoCA).

4. The method according to claim 3, wherein said monitoring is performed by one or more MoCA network controllers.

5. The method according to claim 3, wherein said routing is performed by one or more MoCA network controllers.

6. The method according to claim 1, comprising increasing bandwidth usage efficiency of said premises-based wired and wireless network by said routing.

7. The method according to claim 1, comprising increasing data throughput of said premises-based wired and wireless network by said routing.

8. The method according to claim 1, wherein said monitoring and said routing are performed dynamically.

9. The method according to claim 1, wherein said one or more capabilities comprise one or more media capabilities.

10. A system for multimedia communication, the system comprising:
a network device comprising a bandwidth optimization module, a physical layer (PHY), and a wireless local area network (WLAN) module, said network device for use in a premises-based wired and wireless network, said network device being operable to:
monitor, using said bandwidth optimization module, one or more capabilities of said PHY operating in accordance with a wired communication standard and capabilities of said WLAN module operating in accordance with a wireless local area network standard, in said premises-based wired and wireless network;
communicate reallocation commands to one or more devices in said premises-based wired and wireless network based on said one or more capabilities;
route a first portion of data communications via said WLAN module and a second portion of said data communications via said PHY, based on said reallocation commands; and
configure a bit-loading of said data communications in said PHY and a bit-loading of said data communications in said WLAN module-based on said reallocation commands.

11. The system according to claim 10, wherein said one or more capabilities comprise one or more of: bandwidth, data throughput, usage, and signal-to-noise ratio.

12. The system according to claim 10, wherein said network device comprises a Multimedia over Cable Alliance MoCA network controller.

13. The system according to claim 10, wherein said routing is performed by a MoCA network controller that comprises said network device.

14. The system according to claim 10, wherein said network device is operable to increase bandwidth usage efficiency of said wired and wireless network by the routing.

15. The system according to claim 10, wherein said network device is operable to increase data throughput of said premises-based wired and wireless network by the routing.

16. The system according to claim 10, wherein said one or more capabilities comprise one or more media capabilities.

17. A system for multimedia communication, the system comprising:
- a network controller in a premises, said network controller comprising a bandwidth optimization module, a PHY, and a wireless local area network (WLAN) module, said network controller being operable to:
  - monitor, using said bandwidth optimization module, media capabilities of a wired communication link via said PHY operating in accordance with a wired network standard and capabilities of a wireless communication link operating in accordance with a wireless local area network standard, in a wired and wireless network within said premises;
  - communicate reallocation commands to one or more devices in said premises-based wired and wireless network based on said one or more capabilities;
  - route a first portion of data communications via said WLAN module and a second portion of said data communications via said PHY, based on said reallocation commands; and
  - configure a bit-loading of said data communications in said PHY and a bit-loading of said data communications in said WLAN module-based on said reallocation commands.

18. A method for multimedia communication, the method comprising:
- in a network device of a premises-based wired and wireless network:
  - monitoring one or more capabilities of a wireless communication link operating in accordance with a wireless local area network standard and a wired communication link operating in accordance with a wired communication standard, in said premises-based wired and wireless network;
  - communicating reallocation commands to one or more devices in said premises-based wired and wireless network based on said one or more capabilities;
  - routing a first portion of data communications via said wired communication link and a second portion of said data communications via said wireless communication link, based on said reallocation commands; and
  - configuring a bit-loading of said data communications in said wireless communication link and a bit-loading of said wired communication link based on said reallocation commands.

19. The method according to claim 18, wherein said monitoring is performed by one or more MoCA network controllers.

20. The method according to claim 18, wherein said routing is performed by one or more MoCA network controllers.

21. The method according to claim 18, wherein said one or more capabilities comprise one or more of: bandwidth, data throughput, usage, and signal-to-noise ratio.

22. The method according to claim 18, comprising increasing bandwidth usage efficiency of said premises-based wired and wireless network by said routing.

23. The method according to claim 18, comprising increasing data throughput of said premises-based wired and wireless network by said routing.

24. The method according to claim 18, wherein said monitoring and said routing are performed dynamically.

25. The method according to claim 18, wherein said one or more capabilities comprise one or more media capabilities.

26. A system for multimedia communication, the system comprising:
- a network device for use in a premises-based wired and wireless network, said network device comprising a bandwidth optimization module, a physical layer (PHY), and a wireless local area network (WLAN) module, said network device being operable to:
  - monitor one or more capabilities of a wireless communication link operating in accordance with a wireless local area network standard and a wired communication link operating in accordance with a wired communication protocol, in said premises-based wired and wireless network
  - communicate reallocation commands to one or more devices in said premises-based wired and wireless network based on said one or more capabilities;
  - route a first portion of said data communications via said wired communications link and a second portion of said data communications via said wireless communication link, based on said reallocation commands; and
  - configure a bit-loading of said data communications in said wireless communication link and a bit-loading of said data communications in said wired communication link based on said reallocation commands.

27. The system according to claim 26, wherein said monitoring is performed by one or more MoCA network controllers.

28. The system according to claim 26, wherein said one or more capabilities comprise one or more of: bandwidth, data throughput, usage, and signal-to-noise ratio.

29. The system according to claim 26, wherein said routing is performed by one or more MoCA network controllers.

30. The system according to claim 26, wherein said network device is operable to increase bandwidth usage efficiency of said premises-based wired and wireless network by the routing.

31. The system according to claim 26, wherein said network device is operable to increase data throughput of said premises-based wired and wireless network by the routing.

32. The system according to claim 26, wherein said one or more capabilities comprise one or more media capabilities.

* * * * *